(12) United States Patent
Nakajima

(10) Patent No.: US 6,556,517 B1
(45) Date of Patent: Apr. 29, 2003

(54) MAGNETO-OPTICAL HEAD DEVICE HAVING INTEGRATED AUXILIARY LENS AND MAGNETIC REPRODUCING HEAD AND RECORDING AND REPRODUCING DEVICE USING MAGNETO-OPTICAL HEAD DEVICE

(75) Inventor: Junsaku Nakajima, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/419,232

(22) Filed: Oct. 15, 1999

(30) Foreign Application Priority Data

Oct. 16, 1998 (JP) ............................................. 10-294325

(51) Int. Cl.[7] ................................................ G11B 11/00
(52) U.S. Cl. .................................. 369/13.13; 369/13.33
(58) Field of Search .......................... 369/13.13, 13.33, 369/13.32, 13.17, 112.01, 112.23, 112.24, 44.21

(56) References Cited

FOREIGN PATENT DOCUMENTS

| | | |
|---|---|---|
| EP | 899 721 A1 | 3/1999 |
| JP | 2617025 | 3/1997 |
| JP | 10-162444 | 6/1998 |
| WO | WO98/36409 | 8/1998 |

Primary Examiner—Tan Dinh
(74) Attorney, Agent, or Firm—Dike, Bronstein, Roberts & Cushman Intellectual Property Practice Group, Edwards & Angell, LLP; David G. Conlin; George W. Hartnell, III (57) ABSTRACT

A magneto-optical head device includes a light source, an objective lens which condenses a light beam emitted from the light source, an auxiliary lens which converts an effective numerical aperture of the light beam condensed by the objective lens to irradiate a recording medium with the light beam, and a magnetic reproducing head which is integrated into the auxiliary lens. The magneto-optical head device can thus be decreased in size and information can be reproduced from both surfaces of a disk since the magnetic reproducing head is integrated into the auxiliary lens. Further, when a thermomagnetic recording medium is employed as the recording medium, the magneto-optical head device can reproduce information recorded at a high track density and a high line density.

20 Claims, 11 Drawing Sheets

⇐ MEDIUM RUNNING DIRECTION

ROTATIONAL DIRECTION

B SURFACE

MAGNETO-OPTICAL HEAD DEVICE HAVING INTEGRATED AUXILIARY LENS AND MAGNETIC REPRODUCING HEAD AND RECORDING AND REPRODUCING DEVICE USING MAGNETO-OPTICAL HEAD DEVICE

BACKGROUND OF THE INVENTION

1. Field of the Invention

The present invention relates to a magneto-optical head device and a recording and reproducing device employing the magneto-optical head device, which are applied to an external memory of an electronic computer or the like or used for recording and reproducing a video signal.

2. Description of the Background Art

An optical recording and reproducing method as well as a magnetic recording and reproducing method have recently been developed according to which information can be recorded at a high density to be reproduced. In the optical recording and reproducing method, the track density and line density of an optical disk are generally determined by the spot size of a light beam. On the other hand, in the magnetic recording and reproducing method, the line density of a magnetic disk is determined by a gap of a magnetic head and the track density is determined by the size of the magnetic head (in the direction of tracks). Therefore, generally the optical recording and reproducing method is superior in the track density and the magnetic recording and reproducing method is superior in the line density.

Japanese Patent No. 2617025 (hereinafter referred to as Reference 1) discloses a recording and reproducing method having both advantages of the optical recording and reproducing method and the magnetic recording and reproducing method, in other words, a recording and reproducing method which can implement both of the track density of the optical disk and the line density of the magnetic disk (hereinafter referred to as thermomagnetic recording and reproducing method). Reference 1 employs a ferromagnet as a medium (hereinafter referred to as thermomagnetic recording medium) which has a compensation temperature set at room temperature and generates a great magnetic flux when the temperature rises. Information is recorded by using an optical head to increase the temperature of the thermomagnetic recording medium and using the magnetic head to apply magnetic field to a portion where coercive force is reduced due to the increase in temperature. Information is reproduced by using the optical head to raise the temperature of the thermomagnetic recording medium and using the magnetic head to sense the magnetic flux generated from the portion where the temperature is increased.

According to this method, even if a magnetic head which is wide in he direction of tracks is used, high track density recording and reproduction is possible without causing cross light and crosstalk. Further, information in a region which is smaller than the spot size of light beam can be reproduced. Accordingly, both of the track density of the optical disk and the line density of the magnetic disk are implemented.

In the optical recording and reproducing method, a lens which is substantially hemispherical and called solid immersion lens (SIL) is used trying to reduce the spot size of light beam so as to enhance recording density. According to this method, the SIL is placed in an optical path of a light beam condensed by an objective lens, and the effective numerical aperture is converted by the SIL.

Figure 1:
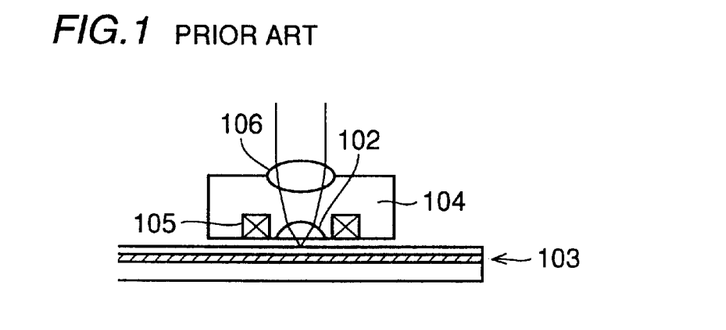
FIG. 1 is a schematic illustrating a structure of a conventional magneto-optical head device using an SIL.

FIG. 1 illustrates a magneto-optical recording and reproducing method disclosed in Japanese Patent Laying-Open No. 10-162444 (hereinafter referred to as Reference 2) as one example of the optical recording and reproducing method using the SIL above. Details are given below in conjunction with this drawing.

A light beam is emitted from a light source (not shown) to be incident on an SIL 102 through an objective lens 106. In SIL 102, the wave length of the light beam is 1/n (n is refractive index) and the beam diameter is 1/n.

SIL 102 is adjacent to a magneto-optical recording medium 103 and the light beam which is incident on the magneto-optical recording medium has the beam diameter of 1/n as in SIL 102. In such a way, SIL 102 is employed to achieve an effect similar to the effect obtained by multiplying the numerical aperture of objective lens 106 by n.

It is noted that a magnetic field coil (magnetic head) 105 and SIL 102 are formed at a slider 104. Information is recorded by irradiating with a light beam magneto-optical recording medium 103 to which magnetic field is applied by magnetic field coil 105.

According to Reference 1, the optical head and the magnetic head are opposite to each other with a disk therebetween. Consequently, the size of the device becomes large and it is impossible to utilize both surfaces of the disk.

According to Reference 2, the optical head and the magnetic coil for recording are placed on the same side of the disk. In this case, both surfaces of the disk are available. However, there arises problems listed below.

1. The size of the device is enlarged since the solid immersion lens and the magnetic recording coil are formed at the slider.
2. Reproduction from the thermomagnetic recording medium is impossible since the medium employed is the magneto-optical medium and no magnetic head for reproduction is provided.
3. A magnetic reproducing head in the thermomagnetic recording and reproducing method should be placed in close proximity to a portion which is irradiated with a light beam. However, in the structure of the magnetic head according to Reference 2, the head cannot be placed in the close vicinity of the portion where the light beam is emitted.

SUMMARY OF THE INVENTION

An object of the present invention is to provide a magneto-optical head device capable of recording and reproducing information at a high track density and a high line density and capable of recording and reproducing information on and from both surfaces of a disk.

Another object of the present invention is to provide a magneto-optical head device which can be decreased in size.

Still another object of the present invention is to provide a recording and reproducing device capable of recording and reproducing information at a high track density and a high line density and capable of recording and reproducing information on and from both surfaces of a disk.

A further object of the present invention is to provide a recording and reproducing device which can be decreased in size.

According to one aspect of the present invention, a magneto-optical head device includes a light source, an objective lens which condenses a light beam emitted from the light source, an auxiliary lens which converts the effective numerical aperture of the light beam condensed by the objective lens to irradiate a recording medium with the light beam, and a magnetic reproducing head integrated into the auxiliary lens.

Owing to the magnetic reproducing head which is integrated into the auxiliary lens, the magneto-optical head device can be decreased in size and information recorded on both surfaces of a disk can be reproduced. Further, if a thermomagnetic recording medium is employed as a recording medium, the magneto-optical head device can reproduce information recorded at a high track density and a high line density.

According to another aspect of the present invention, a reproducing device includes a spindle motor which causes a recording medium to rotate, a magneto-optical head device which reads information recorded on the (recording medium, and a demodulation unit which demodulates information read by the magneto-optical head device. The magneto-optical head device includes a light source, an objective lens which condenses a light beam emitted from the light source, an auxiliary lens which converts the effective numerical aperture of the light beam condensed by the objective lens to irradiate the recording medium with the light beam, and a magnetic reproducing head integrated into the auxiliary lens.

Owing to the magnetic reproducing head integrated into the auxiliary lens, the entire reproducing device can be decreased in size and information recorded on both surfaces of a disk can be reproduced. If a thermomagnetic recording medium is employed as a recording medium, the reproducing device can reproduce information recorded at a high track density and a high line density.

According to a further aspect of the invention, a recording and reproducing device includes a spindle motor which causes a recording medium to rotate, a magneto-optical head device which reads information recorded on the recording medium and writes information onto the recording medium, and a modulation and demodulation unit which demodulates information read by the magneto-optical head device and modulates information to be written onto the recording medium. The magneto-optical head device includes a light source, an objective lens which condenses a light beam emitted from the light source, an auxiliary lens which converts the effective numerical aperture of the light beam condensed by the objective lens to irradiate the recording medium with the light beam, a magnetic reproducing head integrated into the auxiliary lens, land a magnetic recording head integrated into the auxiliary lens.

Since the magnetic reproducing head and the magnetic recording head are integrated into the auxiliary lens, the entire recording and reproducing device can be decreased in size and information can be recorded on and reproduced from both surfaces of a disk. In addition, if a thermomagnetic recording medium is used as a recording medium, the recording and reproducing device can record and reproduce information at a high track density and a high line density.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

A magneto-optical head device in the first embodiment of the present invention is now described in conjunction with FIGS. 2–12. It is noted that the description is given in the order shown below.

1. Basic Structure
2. Auxiliary Lens and Magnetic Recording and Reproducing Head
3. Tracking Method and Focusing Method
4. Recording and Reproducing Method 1. Basic Structure Referring to FIG. 2, the magneto-optical head device includes a laser diode (LD) 1, a collimator lens 2, a polarization beam splitter (PBS) 3, a quarter-wave plate 4, an objective lens 5, an auxiliary lens 6 which converts the effective numerical aperture of a light beam transmitted through objective lens 5, a multi-lens 10 which condenses light reflected from a recording medium 8, and a photodetector 11 which detects the light reflected from recording medium 8.

Figure 2:
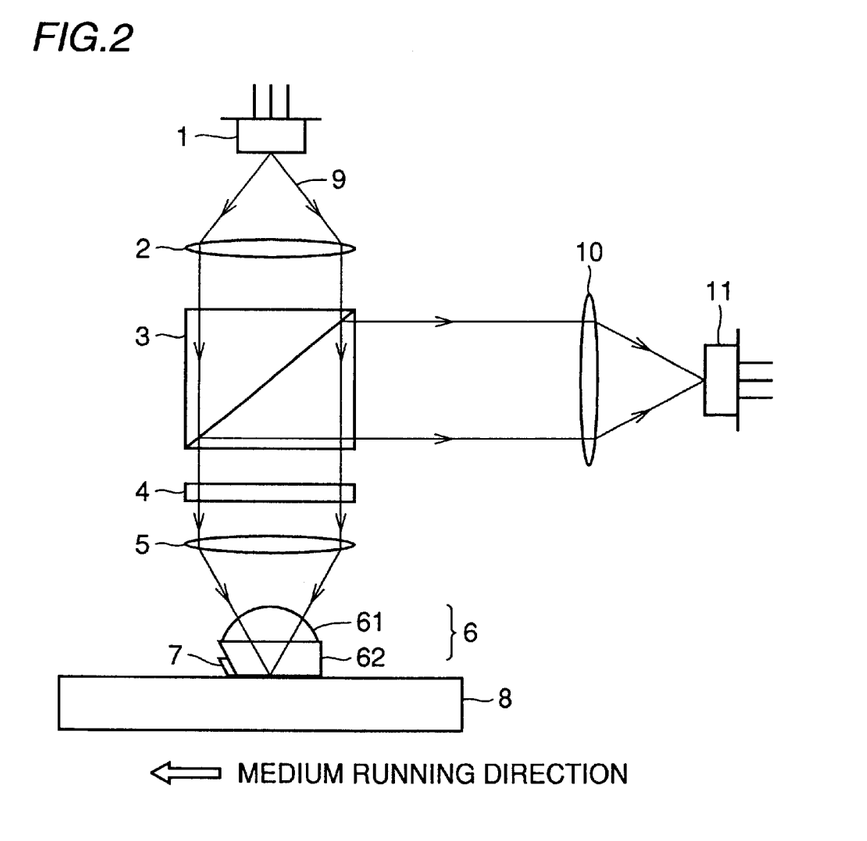
FIG. 2 is a schematic illustrating a structure of a magneto-optical head device in a first embodiment of the present invention.

Light beam 9 emitted from the laser diode which has a wave length of 635 nm and is linearly polarized light advancing in parallel with the plane of the drawing is converted to parallel beam by collimator lens 2. The light passes through collimator lens 2 then passes through PBS 3. The light which has passed through PBS 3 is converted to circularly polarized light by quarter-wave plate 4 and condensed by objective lens 5 having the numerical aperture (NA) of 0.6.

The light beam condensed by objective lens 5 passes through auxiliary lens 6 and is focused on the end surface of recording medium 8. The light beam transmitted through objective lens 5 is incident on auxiliary lens 6 substantially perpendicular to auxiliary lens 6, therefore, the light beam is not diffracted when the light enters auxiliary lens 6. The incident light beam has a spot size of 1/n (n is refractive index) as large as the spot size which is obtained when no auxiliary lens 6 is placed because of the high refractive index (e.g. 1.5) of any component such as glass which constitutes auxiliary lens 6. (In other words, the effective numerical aperture is 1.5 times greater.)

Auxiliary lens 6 and recording medium 8 are arranged such that there is a very small gap therebetween. The dimension of the gap is defined, for example, to be approximately 100 nm. Accordingly, when the light beam is condensed onto the surface of auxiliary lens 6 which faces the medium, the light is also condensed onto recording medium 8 since auxiliary lens 6 and recording medium 8 are located in close proximity to each other. Consequently, the light beam having a spot size 1/n times as large as that of light beam passed through no auxiliary lens 6 is emitted onto recording medium 8.

The light reflected from recording medium 8 passes through objective lens 5 and advances as parallel light. The light then advances as linearly polarized light perpendicular to the plane of the drawing after passing through quarter-wave plate 4 to be reflected by PBS 3. The light passing through multi-lens 10 is then condensed onto photodetector 11. A magnetic recording and reproducing head 7 for recording and reproducing information on and from recording medium 8 is formed at auxiliary lens 6.

As heretofor described, the magneto-optical head device in this embodiment is provided with a composite optical and magnetic head (light source (LD), auxiliary lens, magnetic recording and reproducing head and the like) on one side of the recording medium.

2. Auxiliary Lens and Magnetic Recording and Reproducing Head

Figure 3:
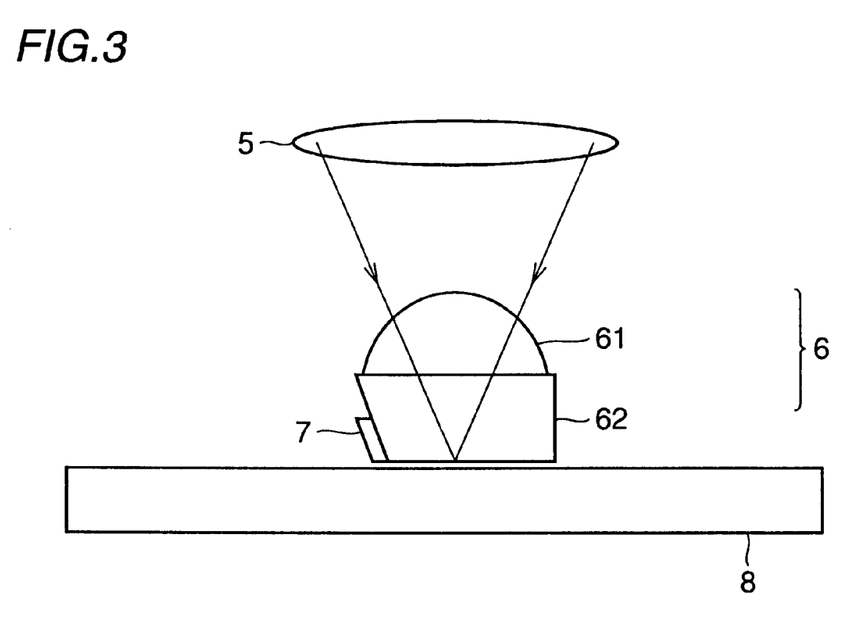
FIG. 3 is an enlarged view of an auxiliary lens 6 in the magneto-optical head device shown in FIG. 2.

FIG. 3 is an enlarged view illustrating the section between recording medium 8 and objective lens 5 shown in FIG. 2. Auxiliary lens 6 is fabricated by attaching a plano-convex lens 61 to a transparent substrate 62 at which magnetic recording and reproducing head 7 is formed. Plano-convex lens 61 is designed such that its surface is shaped to allow a light beam condensed by objective lens 5 to be incident substantially perpendicular to the surface. It is noted that plano-convex lens 61 and transparent substrate 62 are integrated to form a solid immersion lens (SIL).

Plano-convex lens 61 and transparent substrate 62 that constitute the SIL and magnetic recording and reproducing head 7 are thus integrally formed, so that the device can be reduced in size. Further, the portion which is irradiated with the light beam and magnetic recording and reproducing head 7 can be arranged in close proximity to each other.

A method of fabricating auxiliary lens 6 described above is now illustrated in conjunction with FIGS. 4A–5C.

Figures 4A, 4C:
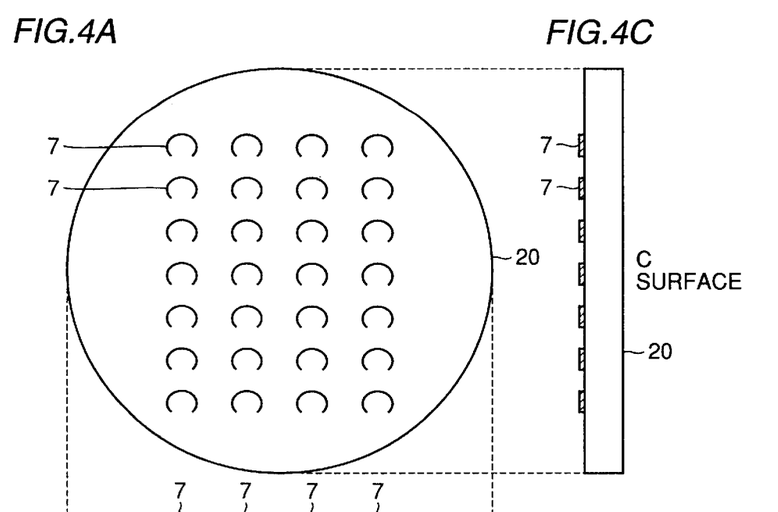
FIGS. 4A–4F illustrate the former half of a manufacturing process of the auxiliary lens 6 and a magnetic recording and reproducing head 7 in the first embodiment of the present invention.
Figure 4B:
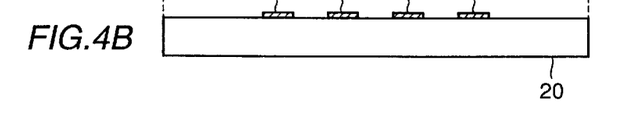

Referring to FIGS. 4A–4C, on a glass substrate (transparent substrate) 20 having a refractive index of 1.5, magnetic recording and reproducing heads 7 each formed of a GMR (Giant Magneto Resistive) head which is a magnetic reproducing head and an inductive head which is a magnetic recording head are formed using a wafer process. The composite magnetic head is well-known in the art of hard disk or the like. The magnetic recording and reproducing head is thus implemented using thin film heads such as the GMR head and the inductive head. As a result, the weight of the head is decreased to achieve a high speed access.

Figures 4D, 4F:
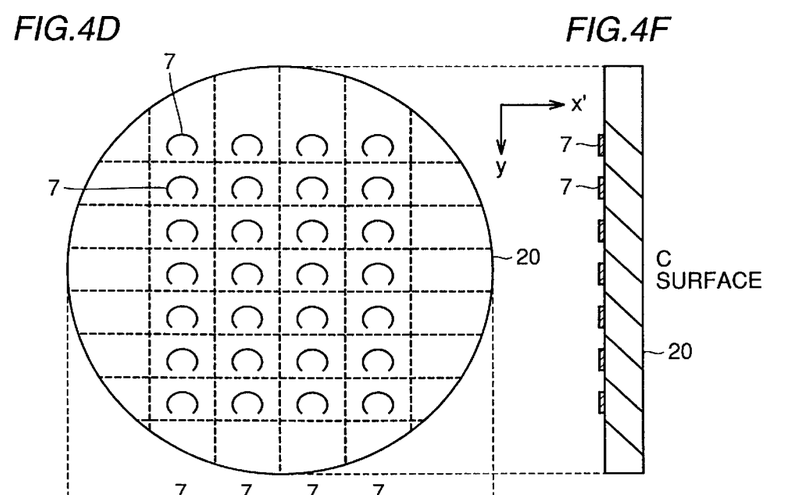
Figure 4E:
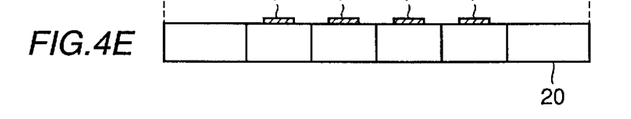

Referring next to FIGS. 4D–4F, substrate 20 is cut such that the cut surface is perpendicular to the surface of substrate 20 when viewed in the y direction and angled at 53° relative to the surface of substrate 20 when viewed in the x direction. The reason why the substrate is cut as angled in this way is given later.

Figure 5A:
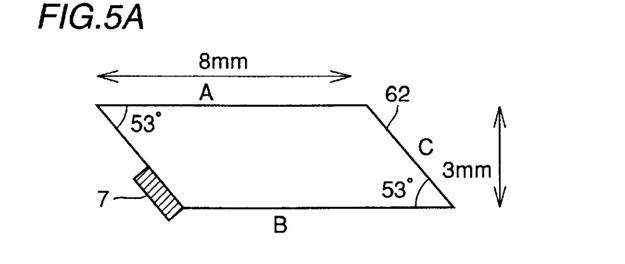
FIGS. 5A–5C illustrate the latter half of the manufacturing process of the auxiliary lens 6 and the magnetic recording and reproducing head 7 in the first embodiment of the present invention.

FIG. 5A illustrates a cut chip as viewed in the x direction. C surface in FIG. 4D corresponds to C surface in FIG. 5A. The chip is 8 mm in length, 3 mm in thickness, and 6 mm in depth.

Figures 5B, 5C:
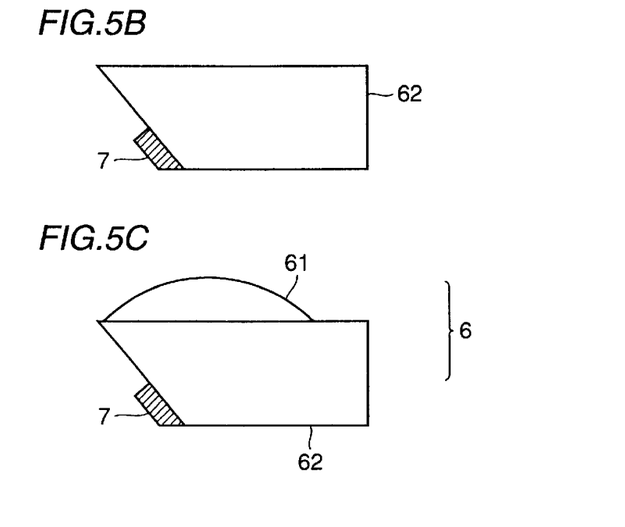

A, B and C surfaces of transparent substrate 62 are processed such that B surface is grinded until the leading edge of magnetic head 7 matches with B surface, A surface is smoothed until it becomes an optical flat, and C surface is also grinded as shown in FIG. 5B.

Finally, plano-convex lens 61 with the refractive index of 1.5 is joined onto A surface of transparent substrate 62. By attaching plano-convex lens 61 and transparent substrate 62 together using resin or the like which has a refractive index approximately equal to those of plano-convex lens 61 and transparent substrate 62 (about 1.5), unnecessary reflection or the like can be avoided. In this way, auxiliary lens 6 into which solid immersion lens 61, 62 and magnetic head 7 are integrated is implemented.

Figure 6:
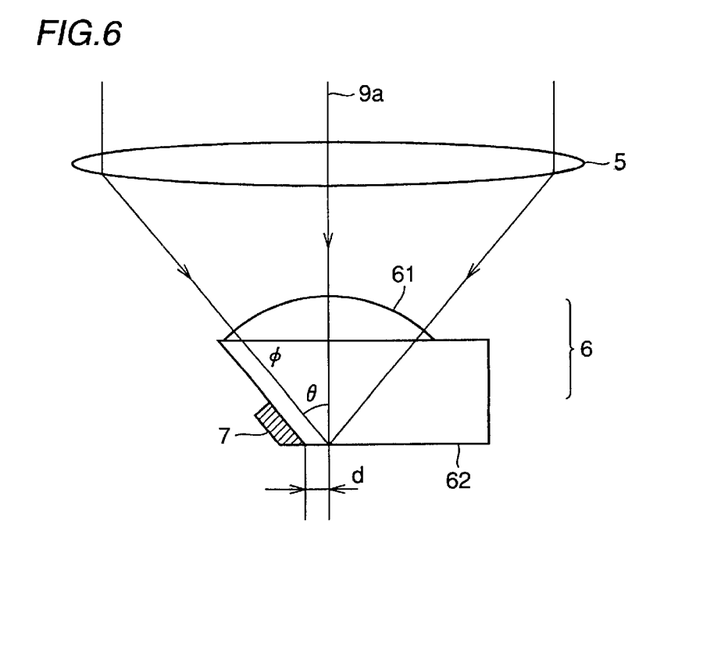
FIG. 6 illustrates an arrangement of the magnetic recording and reproducing head 7 in the first embodiment of the present invention.

The reason why the cut angle is defined as 53° mentioned in the description of FIG. 4D is now described in conjunction with FIG. 6. According to this embodiment, the thermomagnetic recording and reproducing system is employed. Therefore, desirably the interval between the position onto which light beam is emitted on the recording medium and a location where at least the magnetic reproducing head is formed (the location where magnetic recording and reproducing head 7 is formed), i.e. distance d in FIG. 6, should be made small to some extent. In order to this, it is desirable that the angle φ formed by the surface where magnetic recording and reproducing head 7 is formed (C surface) at transparent substrate 62 and the surface which is parallel to recording medium 8 (surfaces A and B: surface which is perpendicular to the direction of an optical axis 9a) is represented by $$\phi \leq 90° - \theta$$

where θ represents half of the angular aperture of the light beam in transparent substrate 62. (See angle φ, θ in FIG. 6.) Accordingly, optical head 7 is not located in the optical path and distance d can be shortened.

In this embodiment, plano-convex lens 61 is employed as designed such that its surface is shaped to allow the optical beam condensed by objective lens 5 to be incident substantially perpendicular to the surface. Since NA of objective lens 5 is 0.6, θ is $\sin^{-1} 0.6 = 37°$. Therefore, the cut angle φ should be 53° (=90°−37°) or less. It is noted that the cut angle 53° is employed because it is preferable that magnetic head 7 faces the medium at an almost right angle relative to the medium.

Although the cut angle φ varies depending on the numerical aperture of the objective lens and the structure of the SIL, the cut angle φ as defined above is available even if the SIL is a so-called super hemispherical lens by setting the angle formed by the direction of optical axis 9a and the surface where magnetic recording and reproducing head 7 is formed (C surface) to be at least θ (the angular aperture of the optical beam in transparent substrate 62 is 2θ).

The magneto-optical head device in this embodiment can thus be reduced in size since the magnetic recording and reproducing head (magnetic head for reproduction and recording) is directly formed at the component of the auxiliary lens. In addition, the reproducing operation can smoothly be implemented since the position which is irradiated with light beam on the recording medium is located in the close vicinity of the magnetic reproducing head.

Although the GMR head and the inductive head are employed as the magnetic recording and reproducing head, the magnetic recording and reproducing head is apparently not limited thereto.

3. Tracking Method and Focusing Method

Figure 7:
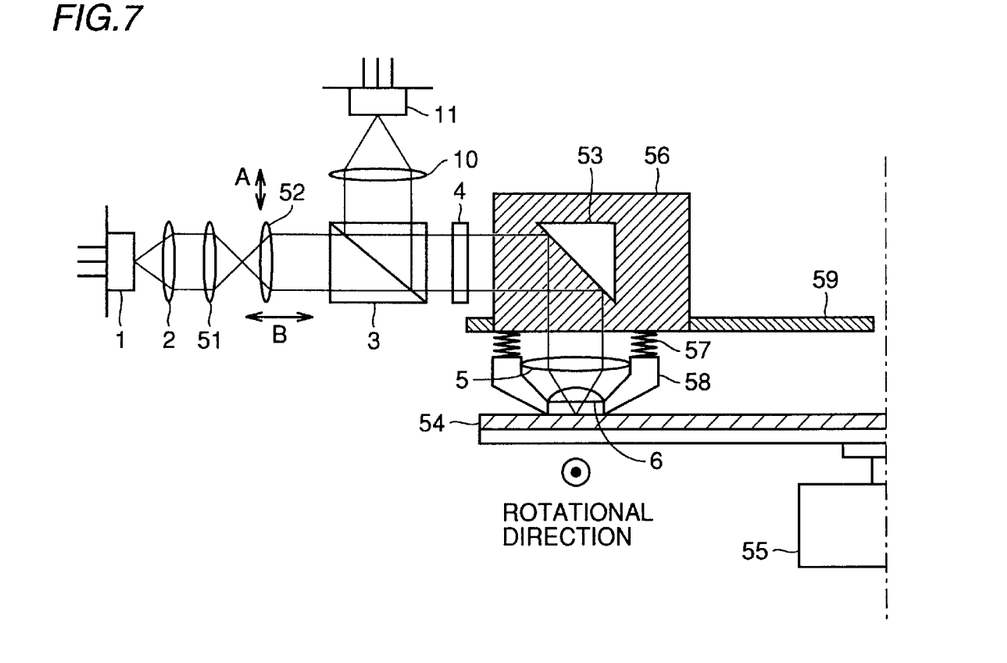
FIG. 7 illustrates an apparatus used for testing recording and reproduction by the magneto-optical head device in the first embodiment of the present invention.

FIG. 7 illustrates an apparatus used for testing recording and reproduction.

Light emitted from laser diode 1 successively passes through collimator lens 2, relay lenses 51 and 52, PBS 3, quarter-wave plate 4, a mirror 53, objective lens 5 and auxiliary lens 6 to reach a recording layer 54 of a disk-shaped recording medium. Recording layer 54 is placed on the upper surface side such that effective recording and reproduction by the magnetic head is implemented.

The light reflected from recording layer 54 of the disk medium is passed through PBS 3 and multi-lens 10 and incident on photodetector 11. Photodetector 11 may have a plurality of divided regions applied to tracking control and focusing control. In this case, a diffraction grating is placed for generating a plurality of beams.

Recording medium 8 is rotated by a spindle motor 55, and the rotational direction is perpendicular to the plane of the drawing. A stage 56 on which the mirror is mounted, objective lens 5, and auxiliary lens 6 are connected by a spring (gimbal) 57 and auxiliary lens 6 flies over the 1medium. Objective lens 5 and auxiliary lens 6 are fixed to a support pipe 58. Stage 56 on which the mirror is mounted is moved in the radius direction of the disk using a shaft 59.

Tracking is implemented by moving stage 56 having the mirror mounted thereon along shaft 59. Focusing is implemented by moving relay lens 52 in the direction of the arrow B. Distance d between magnetic head 7 and a beam spot shown in FIG. 6 is controlled by moving objective lens 5 in the direction perpendicular to the plane of the drawing.

Control of focusing and distance d is implemented by preliminary adjusting and fixing the position of objective lens 5 and relay lens 52 prior to recording and reproduction.

Tracking is implemented by controlling an actuator (not shown) on which stage 56 is mounted such that the reflected light is used to read a track error signal and a beam spot follows a track which is formed on the disk while recording and reproduction are carried out.

4. Recording and Reproducing Method

Figure 8:
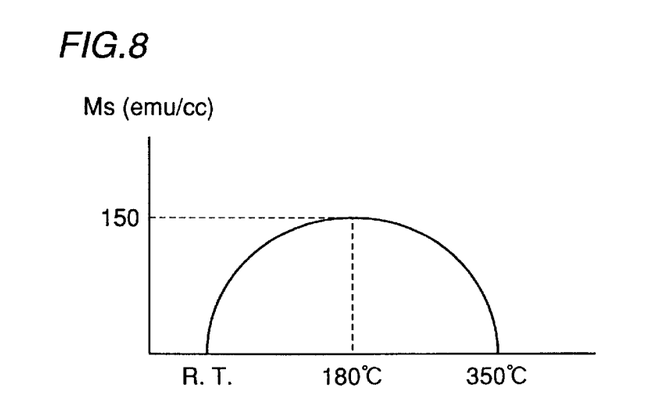
FIG. 8 illustrates the temperature dependency of saturation magnetization in a recording layer of a thermomagnetic recording medium.

FIG. 8 illustrates temperature dependency of saturation magnetization Ms of YGaFeO used for the recording layer of the disk medium. The material is ferromagnet having a compensation temperature equal to room temperature and a Curie temperature equal to 350° C. At room temperature (R.T.), saturation magnetization Ms is approximately 0, and saturation magnetization Ms reaches the maximum value of 150 emu/cc at approximately 180° C.

Figure 9:
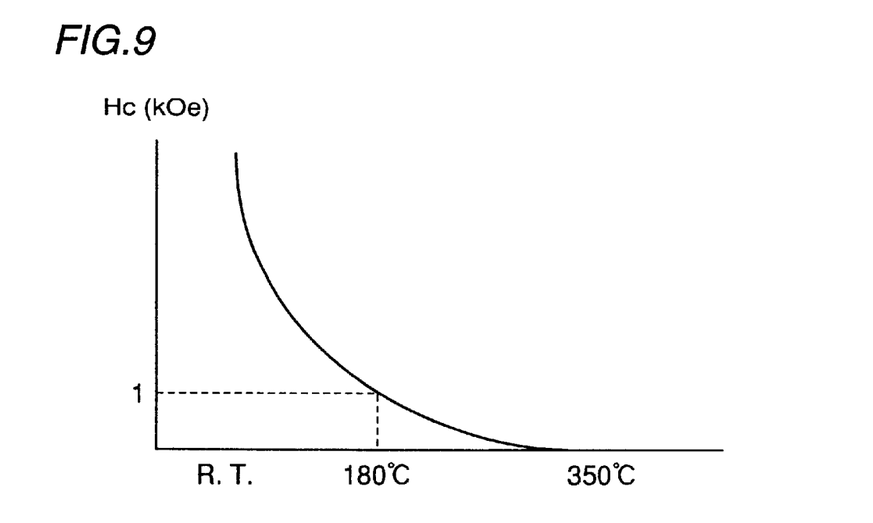
FIG. 9 illustrates temperature characteristics of coercive force in the recording layer of the thermomagnetic recording medium.

FIG. 9 illustrates temperature dependency of coercive force Hc of this material. Coercive force Hc is high at room temperature, decreases as the temperature rises and is equal to 1 kOe at approximately 180° C.

Figure 10:
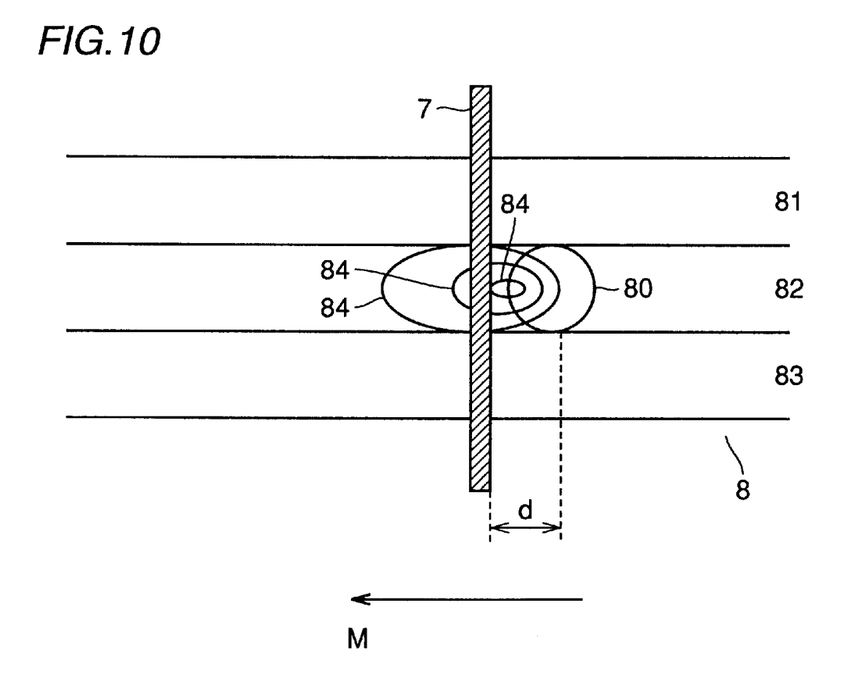
FIG. 10 illustrates a state of the recording layer in the thermomagnetic recording medium when recording and reproduction are carried out.

FIG. 10 illustrates the state in which recording and reproduction are carried out as viewed from above disk 8. Disk 8 moves in the direction of the arrow M and a beam spot 80 is shown to scan over a track 82. Magnetic head has a width extending over adjacent tracks 81 and 83.

The reference numeral 84 represents an isotherm formed in the recording layer. The outermost isotherm represents 100° C., the middle one represents 180° C., and the innermost one represents 200° C. Thermomagnetic recording and reproducing medium 8 has a certain time constant film the time at which laser irradiation occurs until the temperature increases, and further has a certain time constant until the temperature falls to room temperature. Therefore, as illustrated in the drawing, the center of isotherm 84 is located in the downstream in the rotational direction of disk 8 relative to the center of beam spot 80.

It is thus desirable that magnetic recording and reproducing head 7 is placed in the downstream in the rotational direction of disk 8, not at beam spot 80. Still preferably, the isotherm representing temperature (e.g. 180° C.) which is necessary for recording or reproduction by beam irradiation is located in the upstream in the direction of rotation of disk 8 relative to magnetic recording and reproducing head 7. The positional relation between the isotherm and magnetic head 7 varies depending on the number of revolutions of the disk, temperature characteristics of thermomagnetic recording and reproducing medium 8, the intensity of laser, distance d between beam spot 80 and magnetic head 7, and the like. Accordingly, adjustment may be made by changing any of those parameters. For example, if the number of revolutions of the disk is increased for satisfying the demands of high speed reading and writing, the interval between the center of the beam spot and the center of the isotherm increases. In this case, distance d between beam spot 80 and magnetic head 7 is adjusted such that the position of the isotherm is located in the upstream in the direction of rotation of disk 8 relative to the position of magnetic head 7.

In recording, coercive force Hc of a portion with temperature increased by laser irradiation decreases as shown in FIG. 9, and recording is implemented at the portion where the coercive force decreases, by the magnetic field from magnetic head 7. Specifically, referring to FIG. 10, if track 82 is irradiated with laser in recording, adjacent tracks 81 and 83 have a temperature almost equal to room temperature so that coercive force Hc in these regions is high. Therefore, even if magnetic head 7 which is wide in the direction of tracks is used for recording, recording is not implemented on adjacent tracks 81 and 83 and thus no cross light occurs.

In reproduction, from a portion of the recording layer with its temperature increased, magnetic flux (see FIG. 8) according to the temperature leaks and the leaking magnetic flux is detected by the magnetic head. Specifically, referring to FIG. 10, if track 82 is irradiated with laser in the reproducing operation, the temperature of adjacent tracks 81 and 83 is almost equal to room temperature so that the saturation magnetization of these regions is approximately 0. Therefore, even if magnetic recording and reproducing head 7 which is wide in the direction of tracks is employed for reproduction, information recorded on adjacent tracks 81 and 83 is never read and thus so-called crosstalk does not occur.

Accordingly, the recording density in the direction of tracks can be enhanced to be equivalent to the spot size of the light beam. Further, the line density can be enhanced to be equivalent to resolving power determined by the gap width of the magnetic reproducing head. The device employed in this embodiment implements the beam spot size of 0.5 μm by optical constant of the optical system. Further, using a GMR head haling a gap of 0.15 μm as the magnetic reproducing head, a signal of 0.1 μm mark/0.1 μm space can be reproduced without crosstalk. Recording and reproduction are implemented using line velocity of 5 m/sec and laser power of 4 mW.

Figure 11A:
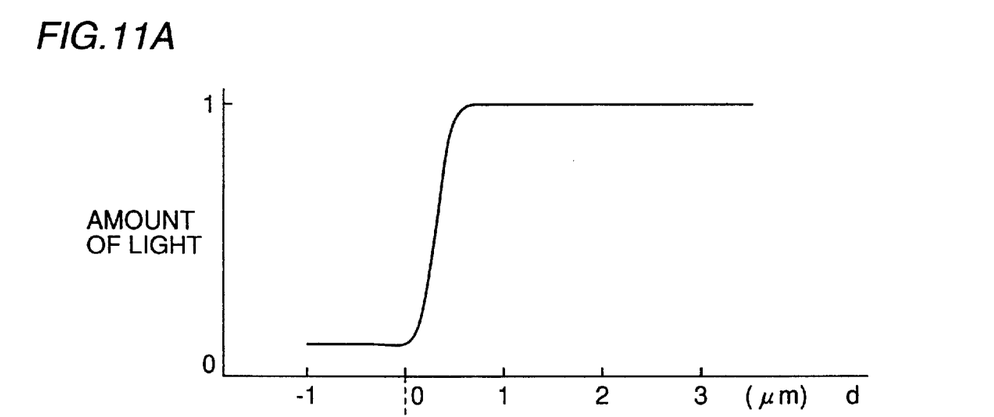
FIGS. 11A and 11B illustrate a relation between the position on which a light beam is condensed and the amount of reflected light.
Figure 11B:
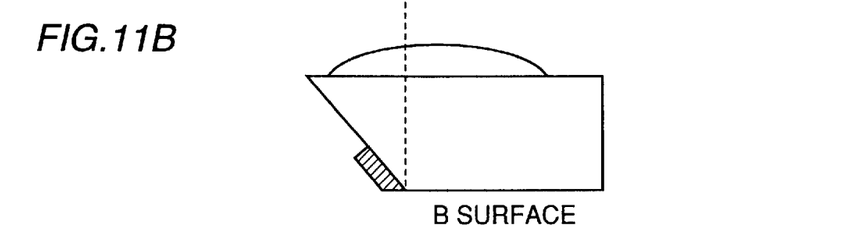

Distance d shown in FIGS. 6 and 10 indicates the distance between the center of beam spot 80 and magnetic head 7. The relation between distance d and the amount of reflected light is examined and its result is shown in FIGS. 11A and 11B. The amount of reflected light is herein measured without placing any medium and thus the amount of light reflected from the end surface (B surface) of auxiliary lens 6 opposite to the medium is measured. The amount of reflected light is saturated when d equals to 1 μm. Therefore, the amount of light at this time is standardized as 1 and the result is shown in the drawing. The amount of reflected light is almost 0 when d<0, the amount of reflected light gradually increases when d>0, and the amount of light substantially reaches saturation when d equals to 0.5 μm. It is thus found that distance d between beam spot 80 and magnetic head 7 may be at least 0.5 μm. The positioning accuracy of 0.5 μm falls in a range which can correctly be achieved.

Figure 12:
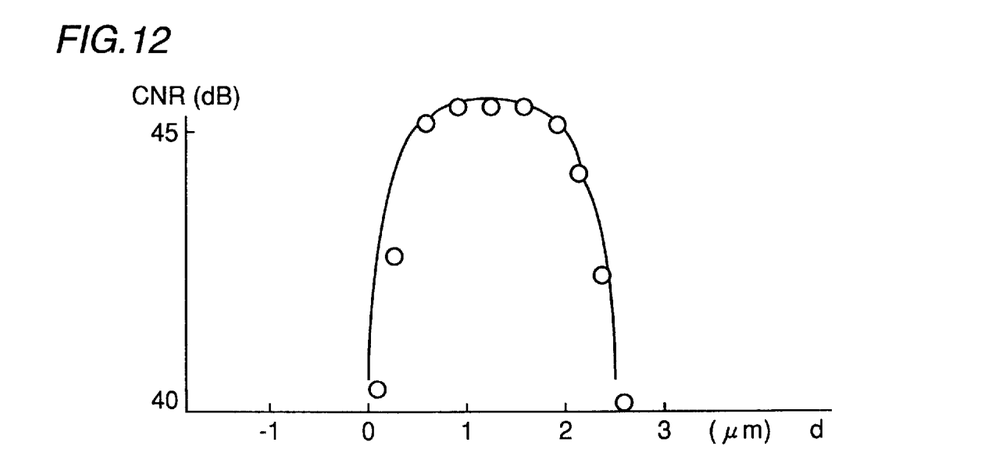
FIG. 12 illustrates a relation between a position on which light is condensed and a signal quality in the magneto-optical head device in the first embodiment of the present invention.

The relation between distance d and CNR (Carrier to Noise Ratio) when a signal with 0.2 μm mark/0.2 μm space is recorded and reproduced with line velocity of 5 m/sec and laser power of 4 mW is examined and its result is illustrated in FIG. 12. Superior signals are obtained when the relation $1 \leq d < 2$ μm is satisfied. Therefore, the position of the relay lens shown in FIG. 7 in the direction perpendicular to the plane of the drawing may be determined such that distance d is in this range.

As heretofore described, using the magneto-optical head in this embodiment, the track density and the line density can be enhanced and both surfaces of the disk can be used as apparent from FIG. 6.

It is noted that optical reproduction is possible with the magneto-optical head by detecting information included in the reflected light, which is not described in this embodiment. In this way, if embossed pits are formed on the medium, for example, any difference in the amount of reflected light can be detected by presence/absence of the embossed pits when the thermomagnetic recording and reproducing medium is unavailable. This is because the magneto-optical head device in this embodiment is provided with a function of reading magnetic information by the magnetic reproducing head and a function of reading optical information by the reflected light. These functions are similarly implemented in embodiments below.

It is noted that the matters described above mean reproduction is possible as magneto-optical head device. Regarding a recording and reproducing device using such a magneto-optical head device, there is no concern about whether the medium is formed with embossed pits, phase change material, dye change material, or magneto-optical recording material. In other words, any optical system and signal processing circuit following the head as well as the wave length of the laser or the like are naturally arranged to be applicable to such medium.

Accordingly, it is possible to prepare a pre-pit on which an address signal or the like is recorded by an embossed pit so as to optically reproduce information recorded on this portion and to reproduce information in a rewritable region by the magnetic head. Optical recording and reproduction of information is possible without using the magnetic head. In this case, the head is employed as an ordinary solid immersion lens.

Second Embodiment

The second embodiment of the present invention is now described in conjunction with FIGS. 13A–15.

According to the first embodiment, magnetic head 7 is a composite head formed by attaching an inductive head for recording and a GMR head for reproduction together. In the second embodiment, a magnetic recording head 71 and a magnetic reproducing head 72 are separated as shown in FIGS. 13A–14D.

A method of fabricating an auxiliary lens 6 provided with magnetic heads employed in this embodiment is similar to that in the first embodiment regarding FIGS. 4A to 4F. However, a magnetic head formed on a substrate is only GMR head 72 for reproduction, and magnetic recording head 71 is separately prepared. This manufacturing process is illustrated below.

Figure 13A:
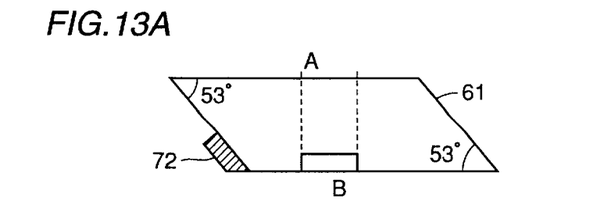
FIGS. 13A–13E illustrate the former half manufacturing process of awn auxiliary lens 6, a magnetic recording head 71, and a magnetic reproducing head 72 in a second embodiment of the present invention.
Figure 13B:
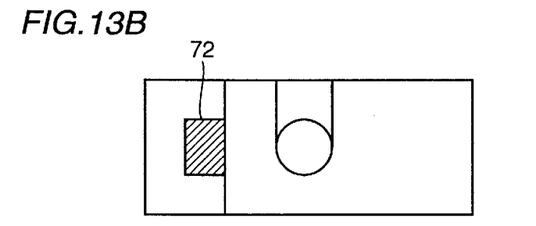

Referring to FIG. 13A, a cylindrical hole with a diameter of 3 mm is made from A surface to B surface of a chip produced by fabricating magnetic reproducing head 72 on a transparent substrate 61 and cutting the substrate. In B surface, a groove which is 0.5 mm in depth and 3 mm in width is formed. FIG. 13B illustrates the cylindrical hole and the groove as viewed from B surface.

Figure 13C:
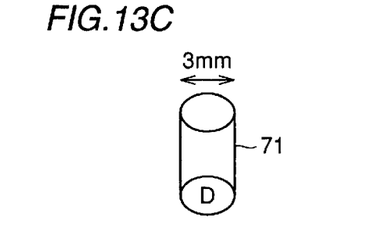

Separately, a solid cylindrical chip (magnetic recording head 71) which is 3 mm in diameter as illustrated in FIG. 13C is fabricated. The chip of the solid cylindrical shape is formed of glass with a refractive index of 1.5 and thus the refractive index is equal to that of substrate 61.

Figure 13D:
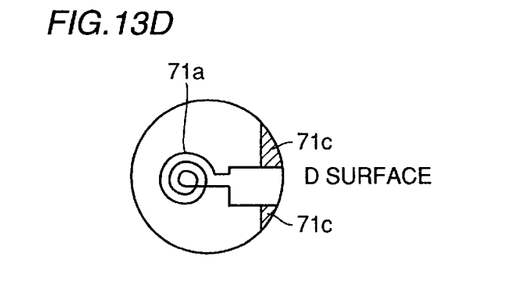
Figure 13E:
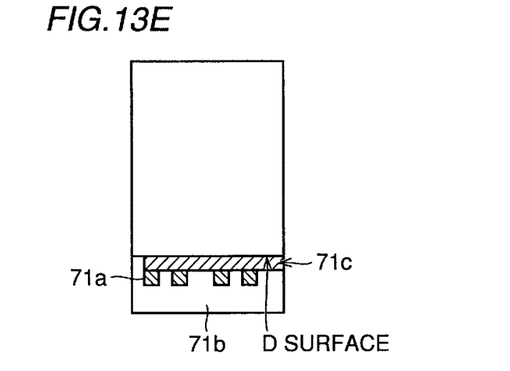

At D surface of the solid cylindrical chip, a coil 71a as shown in FIG. 13D is formed through a thin film process and glass coating 71b is applied thereto. The cross section of the solid cylindrical chip is shown in FIG. 13E. The coating is implemented by applying glass with refractive index of 1.5 to approximately 50 μm. A terminal 71c of coil 71a is exposed on the side surface of the solid cylindrical chip. Such a solid cylindrical chip is inserted into the cylindrical hole of transparent substrate 61.

Figure 14A:
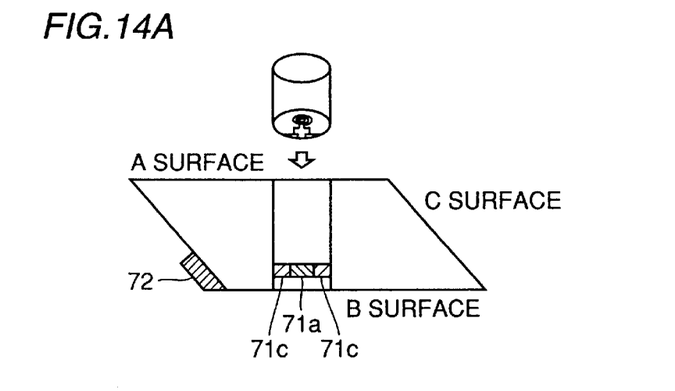
FIGS. 14A–14D illustrate the latter half manufacturing process of the auxiliary lens 6, the magnetic recording head 71, and the magnetic reproducing head 72 in the second embodiment of the present invention.
Figure 14B:
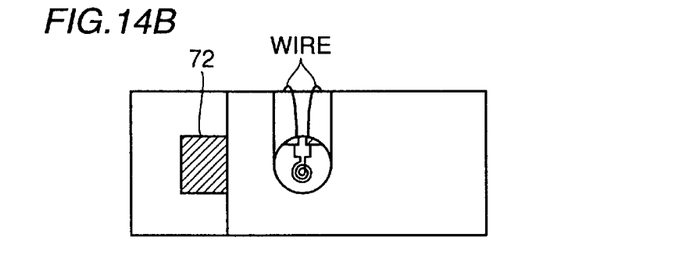

This state is shown in FIG. 14A. After that, A, B and C surfaces are grinded as done in the first embodiment. This state is shown in FIG. 14B as viewed from B surface. Wire passes through the groove formed in B surface to enable electric current to be supplied to coil 71a.

Figure 14C:
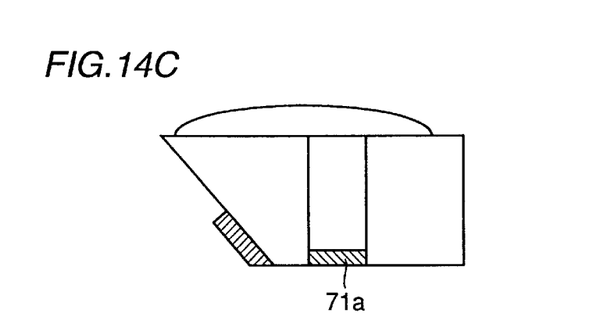

A plano-convex lens is attached at A surface as in the first embodiment to form auxiliary lens 6 shown in FIG. 14C. The coil for recording is opposite to the medium. However, the coil is protected by the glass coating even after the chip is grinded so that no damage is given thereto when the coil is brought into contact with the medium.

Figure 14D:
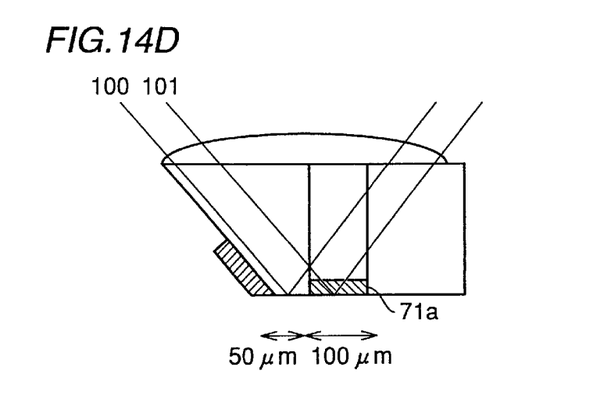

In the magneto-optical head device using such auxiliary lens 6, in recording, light is condensed on the center of the coil through an optical path 101 as shown in FIG. 14D to increase the temperature of a recording layer of the medium. The inner diameter of the coil is about 50 μm and the outer diameter thereof is about 100 μm. The coil is placed near the height of the focus of the beam and the inner diameter is sufficiently large relative to the beam spot. Therefore, the light is not blocked by the coil.

In reproduction, the light is condensed near the magnetic reproducing head through an optical path 100 to increase the temperature of the recording layer of the medium. Since the distance between the magnetic recording head 72 and the outer periphery of recording coil 71 is 50 μm, light is never blocked by recording coil 71 and magnetic reproducing head 72 in the reproducing operation. Further, since material having refractive index of 1.5 is bonded using resin with refractive index of 1.5, there is no unnecessary reflection or refraction within auxiliary lens 6.

Optical path 100 or 101 is employed depending on recording and reproduction. Switching of the optical path is possible by moving the position of the relay lens in FIG. 7 in the direction perpendicular to the plane of the drawing. The switching of the optical path causes a slight change in the angle of light beam incident on plano-convex lens 62. However, this change is minor. If necessary, the angle of incidence may be corrected when the optical path is switched.

Figure 15:
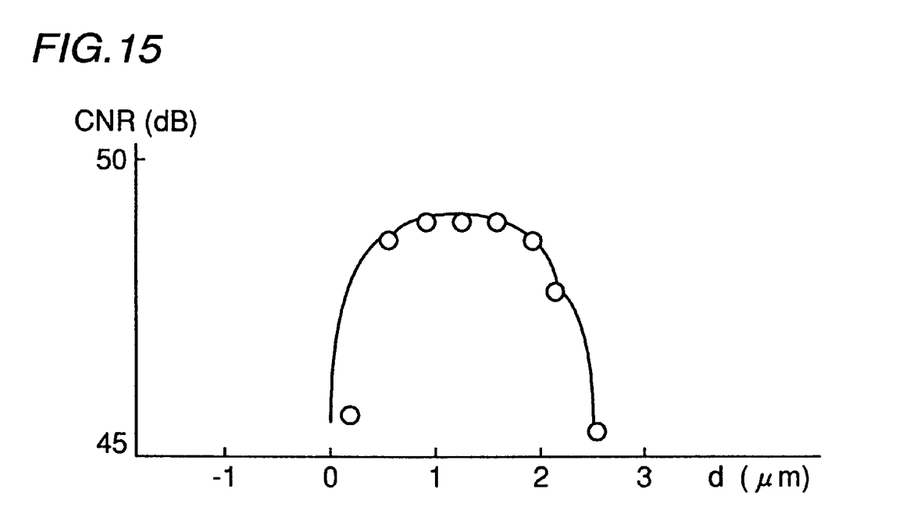
FIG. 15 illustrates a relation between a position on which light is condensed and a signal quality in a magneto-optical head device in the second embodiment of the present invention.

A signal with 0.2 μm mark/0.2 μm space is recorded with linear velocity of 5 m/sec and laser power of 6 mW and a relation between CNR and d when the signal is reproduced with the same line velocity and laser power of 4 mW is illustrated in FIG. 15.

Compared with FIG. 12, a greater CNR is obtained as shown. The reason is considered that the region to which the recording magnetic field is applied is increased relative to that in the first embodiment, the magnetic field is applied until the temperature sufficiently falls in recording, and thus a recording mark is stabilized.

The manufacturing process becomes complicated by separately forming magnetic reproducing head 72 and magnetic recording head 71 compared with the first embodiment in which those heads are integrally fabricated by the thin film process. However, the features of respective heads can be realized to their maximum and accordingly a magnetic head of a high performance can be implemented. The switching of the optical path as described above allows magnetic reproducing head 72 and an optical reproducing beam as well as magnetic recording head 71 and optical recording beam to be closely arranged easily. If magnetic reproducing head 72 and magnetic recording head 71 are separated, the arrangement as described above may not be employed.

As discussed above, using the magneto-optical head device in this embodiment, both of the track density and the line density can be enhanced.

In both of the embodiments above, the magneto-optical head device is constructed to include the magnetic reproducing head and the magnetic recording head such that both of recording and reproduction can be carried out. However, if the device is applied to reproduction only, the magneto-optical head device may include only the magnetic reproducing head. In this case, the function is limited to reproduction only. However, information can be reproduced from not only an ordinary optical recording medium but from a thermomagnetic medium. On the contrary, only a magnetic recording head may be included. In this case, although reproduction from the thermomagnetic recording medium is impossible, reproduction from another optical recording medium, and recording on an optical recording medium including the thermomagnetic recording medium is possible.

Third Embodiment

Figure 16:
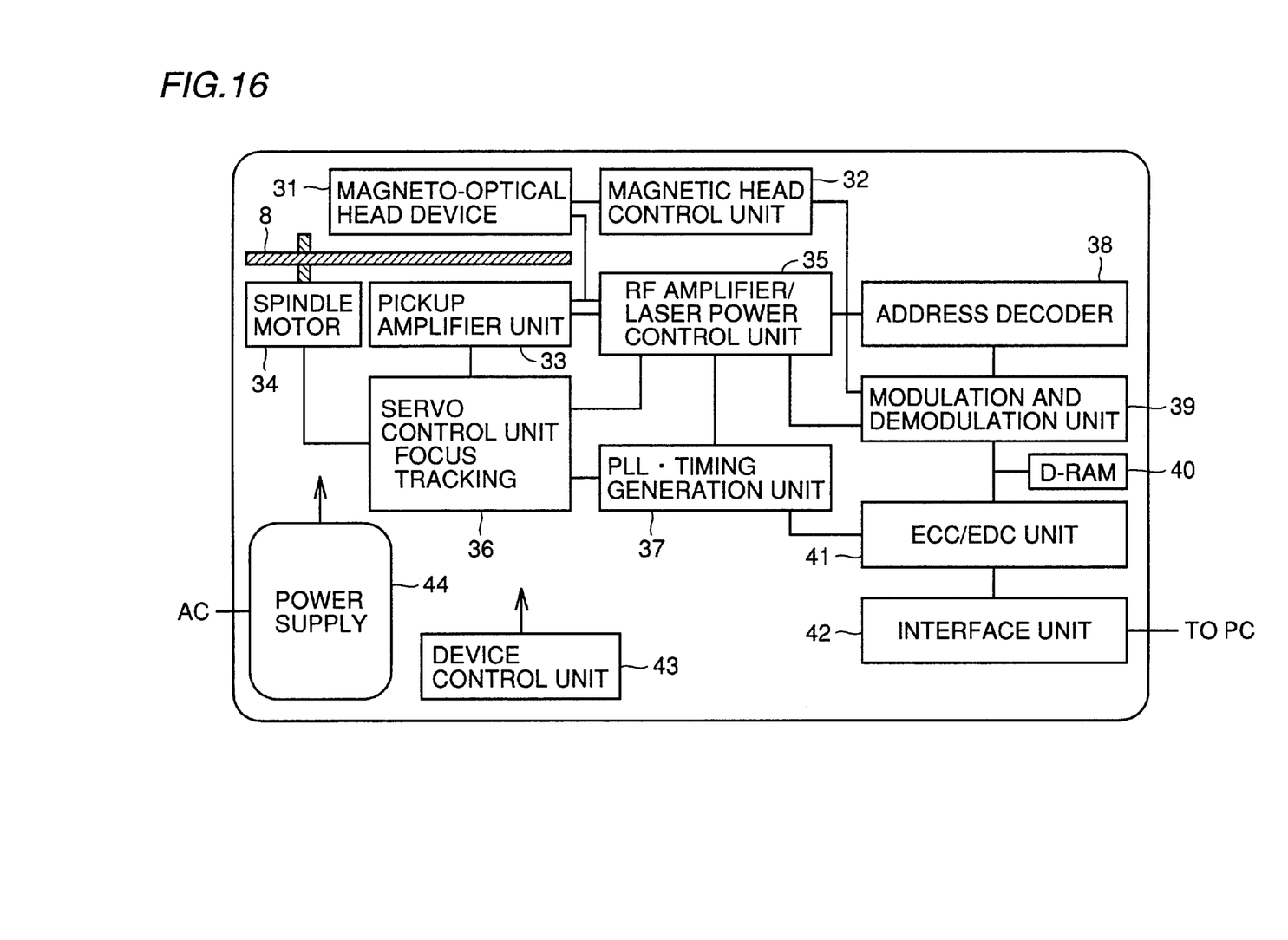
FIG. 16 is a schematic illustrating a structure of a recording and reproducing device in a third embodiment of the present invention.

FIG. 16 is a schematic block diagram illustrating a structure of a recording and reproducing device in the third embodiment of the present invention. The recording and reproducing device includes a magneto-optical head device 31 as illustrated in the first and second embodiments, a magnetic head control unit 32 which controls a magnetic head 7 in magneto-optical head device 31, a pickup amplifier unit 33 which amplifies information such as a synchronous signal read by magneto-optical head device 31, a spindle motor 34 which rotates a thermomagnetic recording medium 8 at predetermined number of revolutions, an RF (Radio Frequency) amplifier/laser power control unit 35 which controls amplification of high frequency of the synchronous signal or the like amplified by pickup amplifier unit 33 as well as output of a laser diode 1 in magneto-optical head device 31, a servo control unit 36 which controls focusing servo, tracking servo and the like, a PLL (Phase Locked Loop) timing generation unit 37 which generates various timing signals for generation of a synchronous signal, servo and the like, an address decoder 38 which extracts an address recorded on thermomagnetic recording medium 8, a modulation and demodulation unit 39 which demodulates data recorded on thermomagnetic recording medium 8 and modulates data to be written on thermomagnetic recording medium 8, a D-RAM (Dynamic Random Access Memory) 40 which temporarily stores data read from thermomagnetic recording medium 8 and data written to thermomagnetic recording medium 8, an ECC (Error Correction Code)/EDC (Error Detection Code) unit 41 which applies an error correction/detection code and carries out error correction/detection, an interface unit 42 for input/output of data to and from a personal computer or the like, a device control unit 43 which makes an entire control of the recording and reproducing device, and a power supply 44.

When data is to be recorded on thermomagnetic recording medium 8, the data is supplied via interface unit 42, an error correction/detection code is applied thereto by ECC/EDC unit 41, and the data is temporarily stored in D-RAM 40. Servo control unit 36 performs tracking of magneto-optical head device 31 to move magneto-optical head device 31 to a track on which the data is to be recorded. Address decoder 38 extracts a predetermined address from the data read by magneto-optical head device 31. When address decoder 38 extracts the predetermined address, modulation and demodulation unit 39 reads written data from D-RAM 40, modulates the data and thereafter supplies the modulated data to magnetic head control unit 32. RF amplifier/laser power control unit 35 controls laser diode 1 within magneto-optical head device 31 to direct a light beam onto thermomagnetic recording medium 8, and magnetic head control unit 32 controls magneto-optical head device 31 to record the modulated data on thermomagnetic recording medium 8.

When data is to be reproduced from thermomagnetic recording medium 8, servo control unit 36 performs tracking of magneto-optical head device 31 to move magneto-optical head device 31 to a track from which data is to be read. RF amplifier/laser power control unit 35 controls laser diode 1 within magneto-optical head device 31 to direct a light beam onto thermomagnetic recording medium 8, and magnetic head control unit 32 controls magneto-optical head device 31 to read data from thermomagnetic recording medium 8. Address decoder 38 extracts a predetermined address from the data read by magneto-optical head device 31. When address decoder 38 extracts the predetermined address, modulation and demodulation unit 39 demodulates the data read by magneto-optical head device 31, and temporarily stores it in D-RAM 40. ECC/EDC unit 41 reads the data stored in D-RAM 40, performs error detection and error correction, and thereafter supplies the data to interface unit 42. Interface unit 42 supplies the data to a personal computer or the like connected thereto.

The recording and reproducing device in this embodiment can thus record and reproduce data at a high track density and a high line density and the data can be recorded and reproduced on and from both surfaces of the disk. Further, the recording and reproducing device can be decreased in size since auxiliary lens 6 and magnetic recording and reproducing head 7 are integrally formed in magneto-optical head device 31.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical head device comprising:
   a light source;
   an objective lens condensing a light beam emitted from said light source;
   an auxiliary lens converting an effective numerical aperture of the light beam condensed by said objective lens to irradiate a recording medium with the light beam; and
   a magnetic reproducing head integrated into said auxiliary lens, wherein when the light beam in said auxiliary lens has an angular aperture of $2\theta$, a surface of said auxiliary lens at which said magnetic reproducing head is formed is fabricated to be angled at $\theta$ or more relative to an optical axis of said auxiliary lens.

2. The magneto-optical head device according to claim 3, wherein said auxiliary lens is formed by joining together a transparent member at which said magnetic reproducing head is formed and a lens member having its refractive index which is almost equal to that of said transparent member.

3. The magneto-optical head device according to claim 1, further comprising a magnetic recording head integrated into said auxiliary lens.

4. The magneto-optical head device according to claim 3, wherein said magnetic recording head is placed opposite to said recording medium.

5. The magneto-optical head device according to claim 4, wherein said magnetic recording head is protected by glass coating.

6. The magneto-optical head device according to claim 3, further comprising means for condensing a light beam to focus the light beam on a location near said magnetic recording head in information recording and for condensing a light beam to focus the light beam on a location near said magnetic reproducing head in information reproduction.

7. The magneto-optical head device according to claim 3, wherein
   said auxiliary lens is formed by joining together a transparent member at which said magnetic reproducing head is formed and at which a hole in which said magnetic recording head is to be inserted is formed and a lens member having its refractive index which is almost equal to that of said transparent member, and
   said magnetic recording head is formed of material having its refractive index which is almost equal to that of said transparent member and a coil is formed at a location opposite to said recording medium.

8. The magneto-optical head device according to claim 1, wherein said is recording medium is a thermomagnetic recording medium.

9. The magneto-optical head device according to claim 1, wherein said magnetic reproducing head is placed to be obliquely opposite to said recording medium.

10. A reproducing device comprising:
    a spindle motor rotating a recording medium;
    a magneto-optical head device reading information recorded on said recording medium and
    a demodulation unit demodulating the information read by said magneto-optical head device,
    said magneto-optical head device including:
      a light source;
      an objective lens condensing a light beam emitted from said light source;
      an auxiliary lens converting an effective numerical aperture of the light beam condensed by said objective lens to irradiate said recording medium with the light beam; and
      a magnetic reproducing head integrated into said auxiliary lens, wherein when the light beam in said auxiliary lens has an angular aperture of $2\theta$, a surface of said auxiliary lens at which said magnetic reproducing head is formed is fabricated to be angled at $\theta$ or more relative to an optical axis of said auxiliary lens.

11. The reproducing device according to claim 10, wherein said auxiliary lens is formed by joining together a transparent member at which said magnetic reproducing head is formed and a lens member having its refractive index which is almost equal to that of said transparent member.

12. The reproducing device according to claim 10, wherein said recording medium is a thermomagnetic recording medium.

13. The reproducing device according to claim 10, wherein said magnetic reproducing head is placed to be obliquely opposite to said recording medium.

14. A recording and reproducing device comprising:
    a spindle motor rotating a recording medium;
    a magneto-optical head device reading information recorded on said recording medium and writing information on said recording medium; and
    a modulation and demodulation unit demodulating information read by said magneto-optical head device and modulating information to be written on said recording medium,
    said magneto-optical head device including:
      a light source;
      an objective lens condensing a light beam emitted from said light source;
      an auxiliary lens converting an effective numerical aperture of the light beam condensed by said objective lens to irradiate said recording medium with the light beam;
      a magnetic reproducing head integrated into said auxiliary lens; and
      a magnetic recording head integrated into said auxiliary lens, wherein when the light beam in said auxiliary lens has an angular aperture of $2\theta$, a surface of said auxiliary lens at which said magnetic reproducing head is formed is fabricated to be angled at $\theta$ or more relative to an optical axis of said auxiliary lens.

15. The recording and reproducing device according to claim 14, further comprising means for condensing a light beam to focus the light beam on a location near said magnetic recording head in information recording and for condensing a light beam to focus the light beam on a location near said magnetic reproducing head in information reproduction.

16. The recording and reproducing device according to claim 14, wherein
    said auxiliary lens is formed by joining together a transparent member at which said magnetic reproducing head is formed and at which a hole in which said magnetic recording head is to be inserted is formed and a lens member having its refractive index which is almost equal to that of said transparent member, and said magnetic recording head is formed of material having its refractive index which is almost equal to that of said transparent member and a coil is formed at a location opposite to said recording medium.

17. The recording and reproducing device according to claim 14, wherein said recording medium is a thermomagnetic recording medium.

18. The recording and reproducing device according to claim 14, wherein said magnetic reproducing head is placed to be obliquely opposite to said recording medium.

19. The magneto-optical head according to claim 1, wherein the magnetic reproducing head is disposed a distance equal to about 0.5 $\mu$m from a center of said light beam.

20. The reproducing device according to claim 10, wherein the magnetic reproducing head of the magneto-optical head device is disposed a distance equal to about 0.5 $\mu$m from a center of said light beam.

* * * * *